United States Patent [19]

Harner

[11] 4,189,648
[45] Feb. 19, 1980

[54] WIND TURBINE GENERATOR ACCELERATION CONTROL

[75] Inventor: Kermit I. Harner, Windsor, Conn.

[73] Assignee: United Technologies Corporation, Hartford, Conn.

[21] Appl. No.: 916,329

[22] Filed: Jun. 15, 1978

[51] Int. Cl.² .............................................. F03D 7/04
[52] U.S. Cl. ......................................... 290/44; 290/55; 416/41
[58] Field of Search ................. 290/44, 55; 416/36, 416/37, 40, 41, 44

[56] References Cited

U.S. PATENT DOCUMENTS

| | | | |
|---|---|---|---|
| 2,547,636 | 4/1951 | Fumagalli | 290/44 |
| 2,666,149 | 1/1954 | Fumagalli | 290/44 |
| 2,832,895 | 4/1958 | Hutter | 290/44 |
| 4,006,925 | 2/1977 | Scherer | 290/44 X |

Primary Examiner—Gene Z. Rubinson
Assistant Examiner—W. E. Duncanson, Jr.
Attorney, Agent, or Firm—Donald F. Bradley

[57] ABSTRACT

A power generating system includes a wind turbine driven generator, the wind turbine having a wind turbine driven rotor with a variable pitch angle blade. Stresses on the system during startup and shutdown are minimized by scheduling the blade angle as a function of the rotor speed and wind velocity to provide a minimum blade angle relative to the fully powered blade angle during rotor acceleration, and to provide a minimum blade angle relative to the fully powered blade angle during rotor deceleration.

6 Claims, 11 Drawing Figures

WIND TURBINE GENERATOR ACCELERATION CONTROL

BACKGROUND OF THE INVENTION

1. Field of Invention

This invention relates to the use of wind energy to drive a wind turbine for the production of electrical power, and specifically to a control system which automatically modulates the pitch angle of the wind turbine blades in order to regulate either electrical output power, shaft torque or speed in order to minimize the effects of wind gusts and turbulence, and to reduce stress on the blades and other mechanical components.

2. Description of the Prior Art

Attempts to harness the forces of nature for man's benefit is recorded in the earliest pages of history. One of the first practical applications was the use of wind energy to drive windmills in order to produce power. A concern that the world's available energy resources will eventually be depleted has resulted in renewed interest in the generation of power from naturally occurring phenomena, and has given rise to the development of various schemes to generate this power economically, efficiently and dependably. As a consequence, the windmill has received considerable attention as a partial solution to supplying the world's increasing energy demands.

The basic problem with windmill or wind turbine generated power is not its overall availability, but in harnessing this power in an efficient manner and supplying it in the proper form useful to electrical utilities or to isolated stations. In many locations winds are, at best, unpredictable as to direction and velocity, and the availability of useful output power at any given time is uncertain. The amount of power available varies with wind speed, and gusts cause transient changes in output power. While the windmill power output may be used directly to drive mechanical devices, its most useful form is electrical, in which form the power may be transmitted to new or existing power grids for use by industry and homes. To produce useful electrical power, the rotary energy of the windmill is used to drive a dynamo, which produces a.c. or d.c. electrical power as desired. In some applications d.c. output power is used to charge large storage batteries, the output from the storage batteries being used to provide electrical power when needed. The use of storage batteries generally necessitates conversion from d.c. to a.c. via static inverters or other means. If a.c. power is produced rather than d.c. via a windmill driven synchronous generator, both the frequency and phase of the a.c. power must generally be regulated, as well as the power output, before the a.c. power can be transmitted to commercial users, or fed into existing power grids.

It has been found that the control necessary to produce electrical power from a synchronous generator, driven by a wind turbine, can be provided by varying the pitch angle of the wind turbine blades, in a manner analogous to the blade pitch control for an aircraft propeller. U.S. Pat. No. 2,363,850 describes a wind turbine driven a.c. generator with a speed governor controlled mechanism for varying the angle of the wind turbine blades between fully feathered and fully powered positions. Means are described to regulate electrical output frequency, phase and power, and to disconnect the electrical generator at wind velocities which are too high or too low to produce the desired power. U.S. Pat. No. 2,547,636 provides an automatic speed control for a wind turbine to control the charging rate of a storage battery, the speed control consisting of mechanical devices responsive to wind velocity for changing the blade pitch angle. U.S. Pat. No. 2,583,369 is a similar control for mechanically adjusting blade pitch angle to maintain a relatively constant electrical generator speed, and hence a relatively constant a.c. output frequency.

U.S. Pat. No. 2,795,285 is directed to a control for varying the rate of change of load, speed or voltage of a wind driven motor by varying the pitch of the wind turbine blades in a closed loop manner. U.S. Pat. No. 2,832,895 is another device for adjusting the blade pitch of a wind turbine in response to a predetermined charge on a battery, or in response to sudden gusts of wind.

The basic problem with the prior art devices is that they do not act rapidly enough, or with sufficient accuracy, to limit stresses in blades and other mechanical components to acceptable levels. They are unduly affected by wind gusts and turbulence, and cannot maintain satisfactory power control over a wide range of wind conditions to allow connection to a conventional power grid or power distribution system. At high wind velocities even mild turbulence creates significant fluctuations in power, and may cause the generator to be removed from the power grid.

The present invention overcomes the limitations of the prior art, and provides a very responsive and rapidly acting pitch control for the blades of a wind turbine. The control maintains a.c. electrical frequency, phase, speed, torque and power within desired tolerances, and also schedules the blade pitch angle during start up and shutdown to prevent undesired loads on the mechanical components. The control is adaptive in that the blade angle controls are responsive to wind velocity magnitude and to changes in wind velocity to maintain satisfactory power, torque and speed control. The control system is preferably electronic and is therefore fast acting, and may be implemented inexpensively with digital computers or microprocessing equipment.

It is therefore an object of the present invention to provide an improved pitch angle control for a wind turbine which modulates the wind turbine blade angle in response to a large number of operating conditions.

Another object of the present invention is an electronic pitch angle control for wind turbines which schedules blade angle to minimize blade stress and shaft torque variations during start up and shutdown transients.

A further object of the present invention is an electronic pitch angle control for wind turbines which regulates speed, torque and power output of a turbine driven synchronous generator in a closed loop manner.

Another object of the present invention is a closed loop blade angle control for a wind turbine in which proportional, integral and derivative control signals are produced, and in which the loop gains are continuously varied as a function of wind velocity.

A further object of the present invention is an electronic control for maintaining the a.c. output from a wind turbine driven synchronous generator at a predetermined power, frequency and phase and which automatically regulates the connection of the a.c. power into a grid.

Another object of the present invention is a power generating system including a wind driven turbine which compensates the blade pitch angle control for rapid changes in the wind.

A further object of this invention is a closed loop control for a wind turbine driven generator in which the closed loop contains an integrator which automatically tracks the blade angle of the wind turbine even when the control is inactive.

Another object of this invention is a wind turbine driven generator system in which wind speed is synthesized from system operating parameters.

A further object of this invention is a wind turbine driven generator in which turbine blade angle is controlled as a function of either generator speed or generator power depending on the connection of the generator to a power transmission grid.

SUMMARY OF THE INVENTION

In accordance with the present invention, a variable pitch wind turbine is connected via conventional gearing to drive a synchronous generator in order to produce a.c. power which may be used directly to power a load, or fed to a conventional power grid system. During start up and shutdown of the wind turbine, the blade pitch angle is scheduled by open loop controls as a function of rotor speed and wind velocity. When the generator is operated independently of a power grid system, the blade pitch angle is scheduled by a closed loop rotor speed control, the loop containing proportional, integral and derivative control signals in addition to lead compensation. When the generator is connected to a power grid system, the blade pitch angle is scheduled by a closed loop shaft torque or generator power control, the loop containing proportional, integral and derivative control signals. Under generator power or shaft torque control, the rotor speed control is modified to act as a topping or overspeed protection. The gains in the closed loop controls are continuously varied as a function of wind velocity to optimize stability and transient response. Wind velocity may be sensed directly, or synthesized as a function of system operating conditions. The control system for blade pitch angle is very responsive to wind gusts and reacts rapidly via an anticipation control signal which is summed with the closed loop control signals during rapid changes in wind conditions to minimize mechanical stresses. An integrator in the closed loop controls is forced via a feedback loop to track the blade pitch angle even when the closed loop controls are inactive. The control system is specifically adapted for implementation using digital electronics, although analog electronic circuitry may also be used.

DESCRIPTION OF THE PREFERRED EMBODIMENT

Figures 1, 2:
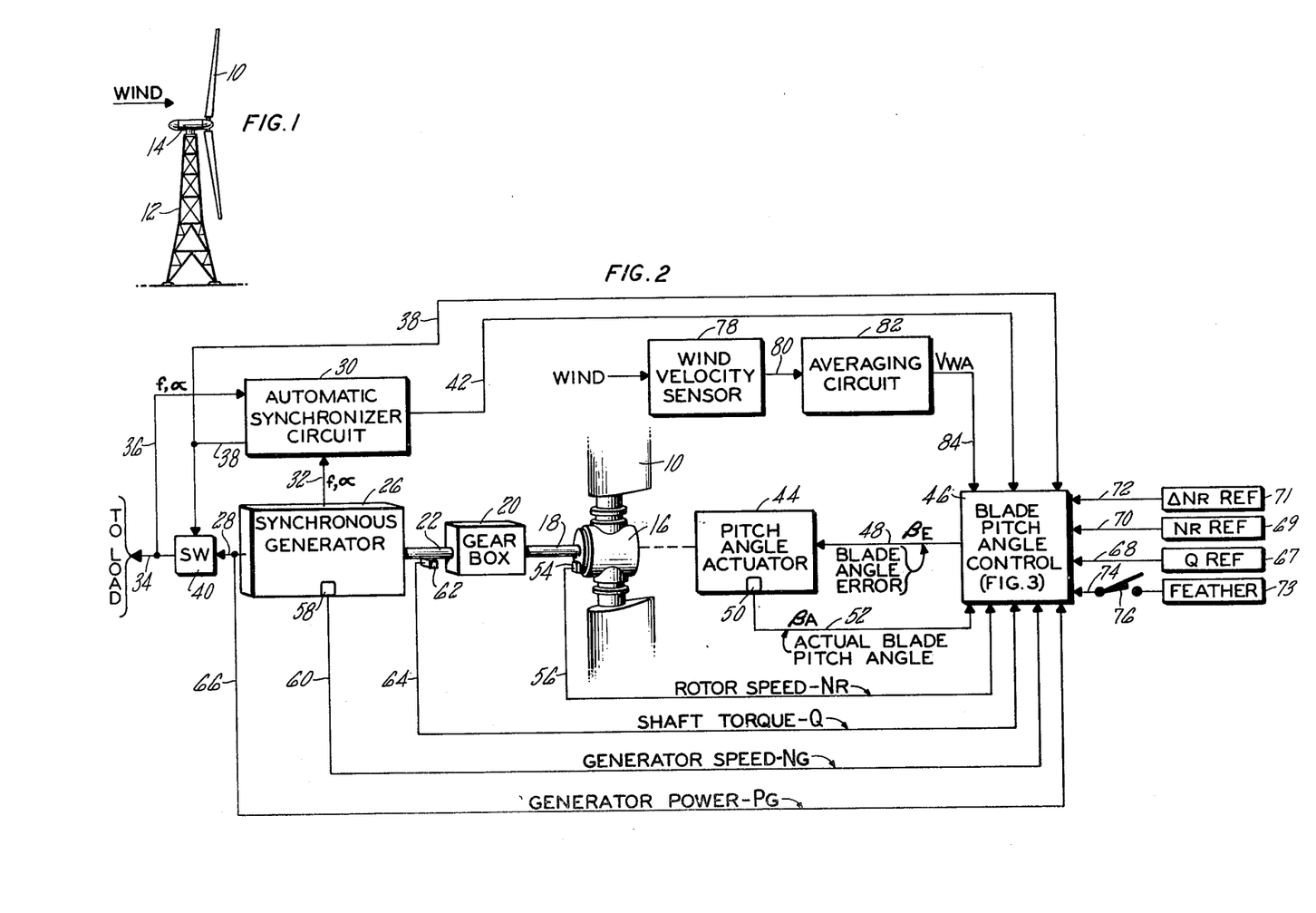
FIG. 1 is a diagram of a representative wind turbine.
FIG. 2 is a schematic diagram showing the interrelationship between the turbine blades, the electrical generating system, and the blade pitch angle control system.

Referring to FIG. 1 there is shown a representative wind turbine construction which consists of two diametrically opposed identical rotor or propeller blades 10, typically totaling 100 to 300 feet in diameter, mounted on an open truss tower 12 which provides adequate ground clearance for the blades while locating the blades in a relatively high wind velocity region. The rotor blades are generally made of aluminum, steel or fiberglass. The electrical generating and other mechanical components are contained in a nacelle 14 and mounted on a bed plate, not shown. The rotor blades 10 are located at the end of the nacelle 14 downwind of the tower 12 to keep them from striking the tower when flapping under impact loading. A yaw control, not shown, may be provided to rotate the nacelle 14 and maintain the rotor blades downwind in response to slow changes of a weather front, rather than permitting the rotor blades to move freely about the yaw axis to follow sudden shifts in wind direction. The nacelle 14 contains the hub for the rotor blades, a gearbox, a hydraulic pitch control for the rotor blades, a synchronous generator for producing electricity from rotation of the rotor blades, and the necessary gearing and controls.

In FIG. 2 there is shown the turbine blades 10 mounted on a hub 16, and the electrical generating system and blade pitch angle control system which are contained in the nacelle 14 of FIG. 1. In general, the electrical generating system shown as a synchronous generator 26, and the mechanical portion of the pitch control for the turbine blades 10, are well known in the art, and will not be described in detail.

A shaft 18 is connected at one end to the hub 16, and at the other end to a conventional gearbox 10 which steps up the rotary motion of the wind driven turbine in a ratio dependent upon the number of pairs of poles in the synchronous generator 26 and the desired output frequency of the synchronous generator. In a typical installation, a wind turbine rotational speed of 40 rpm will be converted in the gearbox 20 to a rotational speed of 1800 rpm to produce from a standard synchronous generator 60 cycle alternating current.

Output shaft 22 from the gearbox 20 is connected at its other end to the synchronous generator 26. A conventional slip coupling may be inserted between the output shaft 22 and the synchronous generator. The synchronous generator 26 typically has a constant magnetic field and an armature which delivers alternating current in synchronism with the rotation of the armature, and at a frequency which is the product of the number of pairs of poles in the synchronous generator and the speed of rotation in rpm. The electrical output from the generator 26 is fed via a line 28, a switch 40 and a line 34 to a load, not shown. The output of the generator 26 may be single phase or three phase. The load may be a storage battery or other power storage device, in which case conversion to d.c. may be necessary, or the power may be supplied directly to a remote installation, in which case the frequency and phase of the output power may be critical. Typically, however, the a.c. power from the generator 26 is fed into the power grid of an electrical utility through which it is transmitted via power transmission lines to a remote location. In this case, the phase relationship between the power grid and the generator output is quite critical, since the phase relationship is a measure of the power transmitted from one to the other, and a phase mismatch between the output of the synchronous generator 26 and the power transmission grid will not only reduce the efficiency of the system, but could in fact drain power from, rather than supply power to, the power transmission grid. Power variations can result in overheating and damage to the synchronous generator. Consequently, there is connected to the synchronous generator 26 an automatic frequency and phase synchronizer circuit 30, the construction of which is well known in the art. The synchronizer circuit 30 insures that the frequency and phase of the synchronous generator is matched to that of the load or power grid before the synchronous generator is connected "on line". Signals indicative of the frequency and phase of the synchronous generator output are fed to the synchronizer circuit 30 via signal line 32. A signal line 36 also feeds to the synchronizer circuit 30 the frequency and phase of the load or power grid appearing on line 34 with switch 40 open. The automatic synchronizer circuit 30 compares the frequency and phase of the synchronous generator with that of the load, and when synchronism occurs a discrete signal will be produced by synchronizer circuit 30 on line 38 which will in turn close switch 40 and connect the synchronous generator "on line". The discrete signal on line 38 is also fed to the blade pitch angle control 46 to be described subsequently.

If the synchronous generator 26 is at the desired frequency but not in phase with the load, a signal is sent from the synchronizer circuit 30 via signal line 42 to the blade pitch angle control 46 which will adjust the rotor speed and therefore the frequency and phase of the output of the synchronous generator to produce synchronization as described subsequently in conjunction with FIG. 6.

Since the output frequency of the synchronous generator is controlled by the speed of rotation of the wind turbine, the maintenance of a predetermined electrical output frequency such as 60 cps requires precise control of the wind turbine rotational speed. The most practical manner of controlling wind turbine rotational speed and therefore generator speed and output frequency, is to vary the pitch angle of the rotor blade to prevent the wind turbine from speeding up when the wind velocity increases, or slowing down when the wind velocity decreases. To prevent fluctuations in speed which occur with unpredictable wind gusts, the control for the blade angle changing mechanism must be very responsive.

In accordance with the present invention there is provided, as shown in FIG. 2, a pitch angle actuator 44 which comprises well known hydraulic actuators and linkages similar to those used with aircraft propellers, but on a larger scale. A control valve in the hydraulic portion of the pitch angle actuator 44 responds to an electrical signal from blade pitch angle control 46 transmitted via a signal line 48. The preferred control valve in the pitch angle actuator 44 is a two stage hydraulic unit with a rapid slew rate, the valve moving the pitch angle control mechanism through conventional linkages and levers. The signal on line 48 is proportional to the blade angle error, $\beta_E$, which represents the difference between the desired or reference blade pitch angle, $\beta_R$, as scheduled by the blade pitch angle control 46 (FIG. 3), and the actual blade pitch angle, $\beta_A$. The actual blade pitch angle, $\beta_A$, is measured by a transducer 50 located in the pitch angle actuator 44, and an electrical signal indicative thereof is fed via a signal line 52 to the blade pitch angle control 46.

The blade pitch angle control 46 is used to modulate the pitch angle of the blades to minimize mechanical stresses during start up and shutdown, and during periods of gusting winds. It is also used as part of a closed loop control to regulate wind turbine rotor speed and thus electrical output frequency in one control mode, or generator output power or shaft torque in another control mode, depending on the type of load. For example, when the wind turbine and generator are used as an isolated generating station, wind turbine rotor speed control is generally sufficient; however, when the generator is connected "on line" with a power grid shaft, torque or generator power control is necessary. In either case the control system must be responsive to wind turbulence to maintain a reasonably constant generator output. The blade pitch angle control 46 schedules the desired blade pitch angle, $\beta_R$, in response to selected operation conditions and reference signals, and provides rapid control of blade pitch angle from a fully feathered position, +90°, to a fully powered position, 0°. Since the rotor blades are not flat but have some twist, the pitch angle in degrees is referenced to the pitch of the blade three quarters of the distance out along the blade from the hub.

In order to provide the necessary data to the blade pitch angle control 46, the instantaneous rotational speed of the wind turbine rotor may be sensed by a transducer 54 connected to hub 16, the transducer being, for example, a toothed wheel having a magnetic pickup associated therewith, for providing an electrical signal, via line 56, proportional to the rotor speed, $N_R$. A similar type of transducer 58 may be connected to the shaft in the synchronous generator 26 to provide an electrical signal, via line 60, proportional to the speed of the synchronous generator, $N_G$. A transducer 62 such as a strain gage, or a plurality of strain gages in different orientations, may be connected with a shaft in gearbox 20, or on shafts 18 or 22, to sense shaft torque Q and feed a signal proportional thereto, via line 64, to the blade angle control 46. The output power (or output current), $P_G$, from synchronous generator 26 may be measured and fed to the blade angle control 46 via signal line 66 connected to the output line 28 of the synchronous generator. Other signal transducers, amplifiers, and/or attenuators may be required, but are not shown for purposes of simplicity.

Also fed to the blade pitch angle control 46 are a plurality of fixed or variable reference signal sources, which may be simple voltage levels in analog format, or a digital word in digital format. A rotor speed reference signal, Nr REF, is generated in a block 69 and fed to the control 46 via a line 70. A torque reference signal, Q REF, is generated in a block 67 and fed to the control 46 via a line 68. A reference signal indicated as $\Delta$Nr REF, which is used as a speed topping control, is generated in a block 71 and fed to the control 46 via a signal line 72. A control signal indicated as FEATHER, used for feathering the wind turbine rotor blade, is generated in a block 73 and fed to control 46 via a signal line 74 and a switch 76.

The wind velocity is sensed by a wind velocity sensor 78, preferably mounted on the nacelle 14 of FIG. 1, or at some other location where it is not affected by the rotation of the wind turbine. The wind velocity sensor 78 measures instantaneous wind velocity, and feeds a signal indicative thereof via a signal line 80 to an averaging circuit 82, the averaging circuit being an electronic integrator, or a digital or microelectronic component which provides statistical processing, and which determines average wind velocity over a preselected time. The output from the averaging circuit 82, the average wind velocity, $V_{WA}$, is fed to the control 46 via a signal line 84.

For purposes of the present exemplary description of the invention, it will be assumed that the synchronous generator 26 begins to produce usable power at a wind velocity of 8 miles per hour and develops its rated output, for example of 100 kilowatts, in a 18 mile per hour wind. It will also be assumed that the rated rotor speed is 40 rpm, at which speed an a.c. output of 60 cps is produced by the generator 26.

Figure 3:
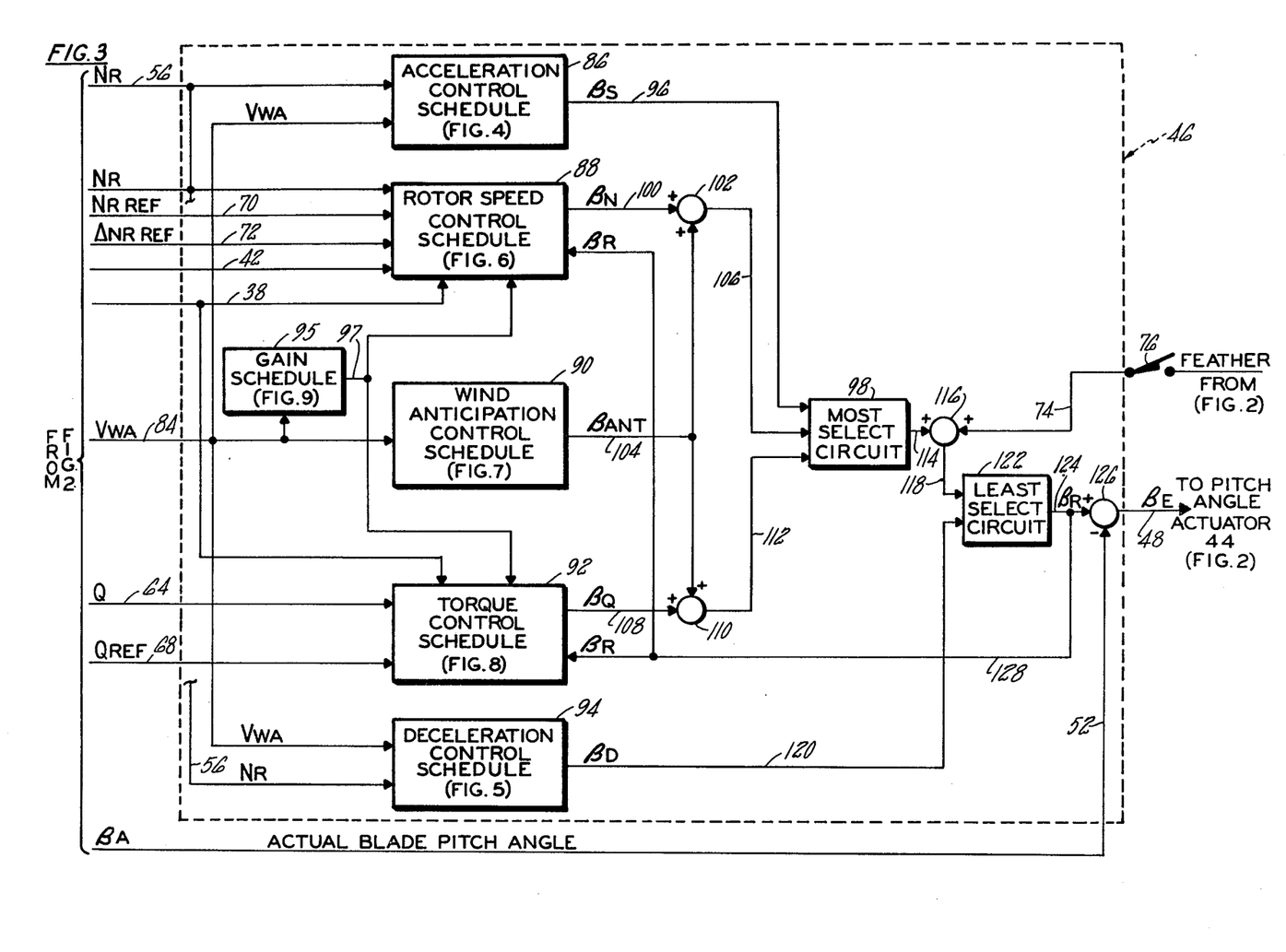
FIG. 3 is a schematic diagram of the blade pitch angle control system of FIG. 2.

The details of a preferred implementation of the blade pitch angle control 46 of FIG. 2 are shown in FIG. 3 in block diagram form. The control consists of an acceleration control schedule 86, a rotor speed control schedule 88, a wind anticipation control schedule 90, a torque control schedule 92, and a deceleration control schedule 94. The operation of the wind turbine can be separated into four operating modes, namely, start up, rotor speed control, torque (or power) control when the wind turbine is connected to a power utility grid, and feather or shutdown. The control 46 provides an open loop scheduled control of rotor blade pitch angle during start up and shutdown, and closed loop feedback control of the rotor blade pitch angle for speed and torque (or power) regulation. In addition, the gains in the rotor speed control schedule 88 and the torque control schedule 92 are varied in response to wind velocity by a gain schedule 95, via a signal line 97.

Each of the five schedules 86, 88, 90, 92 and 94 produces an output signal which is indicative of a desired blade pitch angle, and is referred to as a blade angle reference signal, for the particular operating conditions of the wind turbine. The output signal from the acceleration control schedule 86, an acceleration blade angle reference signal, $\beta_S$, appears on a signal line 96 and is fed as an input to a most select circuit 98. The output signal from the rotor speed control schedule 88, a rotor speed control blade angle reference signal, $\beta_N$, appears on a signal line 100 and is fed to a summing junction 102. The output signal from the wind anticipation control schedule 90, a wind anticipation blade angle reference signal, $\beta_{ANT}$, appears on a signal line 104 and is also fed to summing junction 102 where it is summed with the rotor speed control blade angle reference signal, $\beta_N$. The output from the summing junction 102, on a signal line 106, is thus the sum of the rotor speed control blade angle reference signal, $\beta_N$, and the wind anticipation blade angle reference signal $\beta_{ANT}$. The signal on line 106 is also fed as an input to most select circuit 98. The output signal from the torque control schedule 92, a torque control blade angle reference signal, $\beta_Q$, appears on a line 108, and is fed to a summing junction 110 where it is also summed with the wind anticipation blade angle reference signal, $\beta_{ANT}$, on line 104, the output from the summing junction 110 on a line 112 being fed as a third input to most select circuit 98.

The most select circuit 98 selects and passes therethrough the one signal on lines 96, 106 or 112 which calls for the highest blade angle, i.e. that signal which schedules the blade angle closest to feather or 90°. The selected signal during start up of the wind turbine will normally be the acceleration blade angle reference signal, $\beta_S$, on line 96, and as the rotor speed increases and approaches the rated speed, the selected signal will normally be either the signal on line 106 or the signal on line 112, depending on whether or not the synchronous generator is connected "on line".

The output from the most select circuit 98 on a line 114 is fed as an input to a summing junction 116. Also fed as an input to the summing junction 116 is the FEATHER reference signal on line 74. If, however, switch 76 in line 74 is open, no signal appears on line 74, and the output from the summing junction on a line 118 is identical to that on line 114, i.e., the output from most select circuit 98.

The output signal from the deceleration control schedule 94, a deceleration blade angle reference signal, $\beta_D$, appears on a signal line 120, and is fed as the other input, together with the signal on line 118, to a least select circuit 122. The least select circuit selects or passes therethrough the signal on input lines 118 or 120 calling for the lowest blade angle, i.e., that closest to fully powered or 0°. During normal powered operation the signal selected by the least select circuit will be that on the line 118. When, however, it is desired to shut down the wind turbine rapidly, feather switch 76 is closed and the FEATHER reference signal appears on line 74, this signal calling for a very high blade angle. At this time the signal on line 120, the deceleration blade angle reference signal, $\beta_D$, will schedule a lower blade angle and will be the one selected by least select circuit 122. Selection of the $\beta_D$ signal permits the rate at which the blade angle is feathered to be limited in order to minimize the stresses in the blades when decelerating, and limiting the negative torque generated by the rotor.

The output from the least select circuit on a line 124 is referred to as the resultant blade angle reference signal, $\beta_R$, and is fed to a summing junction 126 and compared with the actual blade pitch angle signal, $\beta_A$, on line 52 to produce the blade angle error signal, $\beta_E$, on line 48. It is this latter signal which is sent to the pitch angle actuator 44, FIG. 2.

The resultant blade angle reference signal, $\beta_R$, on line 124 is also used for integrator tracking in the rotor speed control schedule 88, and in the torque control schedule 92, and is fed to both schedules via a signal line 128.

Each of the control schedules 86, 88, 90, 92 and 94 will be described in detail with reference to FIGS. 4–8.

To start the wind turbine, feather switch 76 is opened, removing the FEATHER reference signal on line 74. The signal $\beta_S$ produced on line 96 by the acceleration control schedule 86 is the selected signal at this time, and is effective to vary the pitch angle of rotor blade 10 to move it out of a feather position, +90°, at which there is no lift and therefore no torque, and move it toward the fully powered position, 0°. As the speed of the rotor increases, the torque provided by the rotor increases under certain conditions of pitch angle and rotor speed. There are some conditions of rotor speed and rotor pitch angle where negative torque or deceleration occurs, so consequently the rate of pitch angle change during start up is not arbitrary but must be scheduled in accordance with the particular characteristics of the wind turbine. If the pitch angle is changed too rapidly from the feathered position, the rotor blade may stall. Consequently, a controlled or scheduled pitch angle change is required. Varying the pitch angle at a fixed rate from the blade feathered position until the wind turbine rotor reaches its rated speed is one alternative which has been found useful, as long as the pitch rate is varied rapidly in order to prevent the rotor blade from lingering at the rotational speeds which will excite the system resonances. As wind speed increases, the time to start up the wind turbine will decrease; a higher inertia rotor will take longer to accelerate. Acceleration of the blade increases rapidly with rotational velocity.

Figure 4:
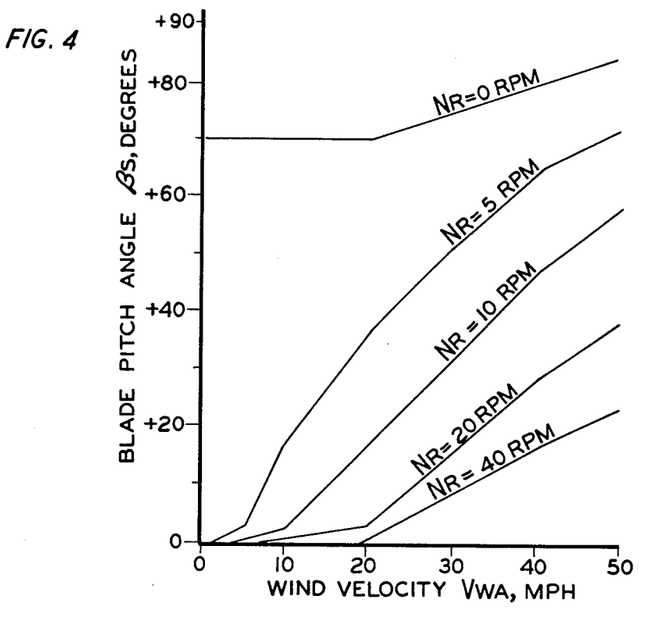
FIG. 4 is a graph showing the acceleration control schedule for the blade pitch angle.

While adequate performance during acceleration of the wind turbine may be achieved by scheduling the change in rotor blade pitch angle from feather to fully powered at a fixed rate, considerably improved performance providing more rapid acceleration and reduced stress at all wind velocities may be achieved by scheduling blade pitch angle as a function of average wind velocity, $V_{WA}$, and rotor speed, $N_R$. FIG. 4 shows in graph form a bivariate acceleration control schedule in which the optimum acceleration blade angle is plotted with respect to wind velocity for different rotor speeds. Minimum starting blade angle is thus defined as a function of average wind velocity, $V_{WA}$, and rotor speed, $N_R$. The schedule of FIG. 4 is implemented in acceleration control schedule 86 of FIG. 3 in which the two input signals, $V_{WA}$ and $N_R$, appear respectively on signal lines 84 and 56, and the output signal on line 96 is the acceleration blade angle reference signal, $\beta_S$, scheduled in accordance with the schedule of FIG. 4. The implementation is most easily accomplished digitally via a read only memory, although analog circuitry may be used. As may be seen in FIG. 4, at start up or 0 rpm, a blade angle of $+70°$ or higher is scheduled, depending on wind velocity. As the rotor speed increases, providing torque to the synchronous generator, the blade pitch angle is decreased gradually toward 0° until the wind turbine rotor reaches its rated speed. The curves shown in FIG. 4 incorporate minimum blade angle limits which prevent the wind turbine rotor from generating accelerating torque which are greater than approximately 200% (or some other desired limiting value) of normal rated torque so as to minimize the blade stresses and torque transmitted through the rotor shaft and gearbox arrangement. Thus, during start up of the wind turbine, the rotor blade pitch angle is scheduled exclusively by the acceleration control schedule 86.

While not shown in the Figures, the $N_R$ or rotor speed input signal to the acceleration control schedule 86 of FIG. 3 can be replaced with only minor system variations by the $N_G$ or generator speed signal, since there is a direct ratio between rotor rpm and generator rpm via the gearbox 20. The general shape of the curves of FIG. 4 will not change.

As the wind turbine rpm increases, in accordance with the acceleration control schedule 86, the rotor rpm approaches the value scheduled in the rotor speed control schedule 88, by the $N_R$REF signal on line 70. During start up, the actual rotor speed $N_R$ on line 56 will always be less than the desired rotor speed, $N_R$REF, and the output from the rotor speed control schedule on line 100, $\beta_N$, will call for a low blade angle, i.e. when underspeed is sensed, the rotor speed control schedule 88 will schedule a low blade angle in order to attempt to increase the rpm and bring the rotor and synchronous generator up to the desired speed. The most select circuit 98 at this time will not permit the signal on line 106 to pass through, since a higher blade angle is being called for by the $\beta_S$ signal on line 96. As the rotor speed increases and Nr approaches the value selected by the $N_R$REF signal, the $\beta_N$ signal will call for a higher blade angle, while the $\beta_S$ signal will call for a lower blade angle, and a point is reached whereby control of the blade angle is assumed by the rotor speed control schedule 88.

Referring to FIG. 3, the rotor speed control schedule 88 is shown as being provided with input signals of desired rotor speed, $N_R$REF, on line 70, actual rotor speed, $N_R$, on line 56, and the topping speed reference signal $\Delta N_R$REF, on line 72. Signals are also fed to the rotor speed control schedule 88 from the automatic synchronizer circuit 30 (FIG. 2) via lines 38 and 42. Feedback of the blade angle reference signal, $\beta_R$, is provided via line 128, and gains for the control schedule 88 are provided via line 97. Basically, the rotor speed control schedule 88 compares the actual rotor speed, $N_R$, with the desired rotor speed, $N_R$REF, to produce a rotor speed error signal, from which there is scheduled, through proportional, integral and derivative controls, the blade pitch angle, $\beta_N$, to provide a stable, fast responding system which minimizes excursions in rotor rpm, and therefore a.c. output frequency, which result from wind gusts or loss of electrical load. Rate of change of rotor speed is also monitored to provide additional lead compensation. The topping signal, $\Delta N_R$REF, is utilized only when the synchronous generator is connected on line. The detailed implementation of the rotor speed control schedule 88 is shown in FIG. 6.

Figure 6:
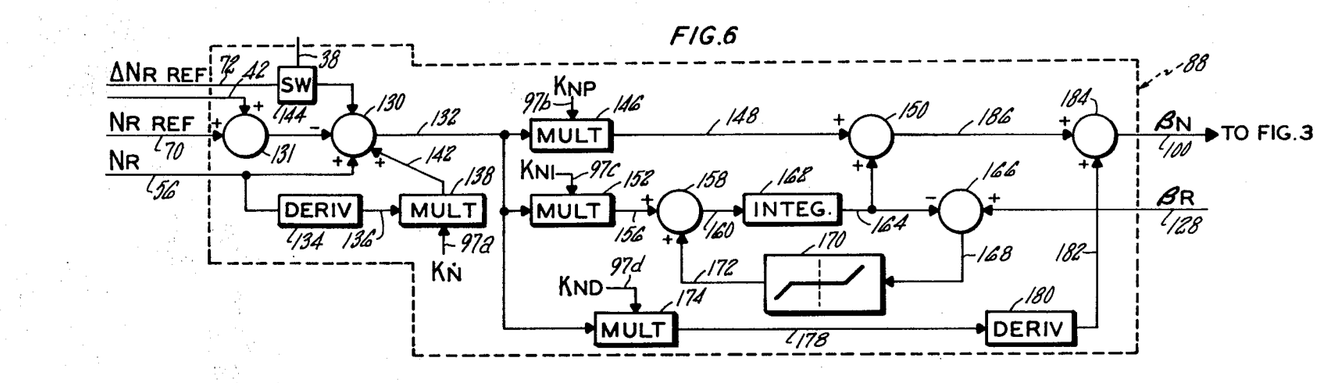
FIG. 6 is a schematic block diagram of the rotor speed control schedule.

Referring to FIG. 6, the actual rotor speed signal, $N_R$, on line 56 is compared with the desired rotor speed signal, $N_R$REF, on line 70, in a summing junction 130, and a speed error signal proportional to the difference therebetween is produced on a signal line 132. The $N_R$REF signal on line 70 may have added thereto, via a summing junction 131, the signal on line 42 to produce phase synchronization of the generator 26 with the load as will be described. The $N_R$ signal on line 56 is also fed to a derivative circuit 134, and the output from derivative circuit 134, a lead signal, is fed via a line 136 to a gain multiplier circuit 138. The gain of multiplier 138 is variable as a function of wind velocity, and is shown as $K_N$ on a signal line 97a. The variable gain feature of this invention will be described in conjunction with FIG. 9. The output from multiplier 138 is fed to summing junction 130 via a signal line 142 in the same sense as the $N_R$ signal, so that the signal appearing on line 132 is actually rotor speed error plus a constant times the rate of change of rotor speed.

A switch 144 is provided in line 72, the switch being normally open, thereby preventing connection of the $\Delta N_R$REF topping signal to summing junction 130. When, however, the synchronous generator is connected on line to a power grid, blade angle control is switched to the torque schedule 92, (FIG. 3) and switch 144 is closed by the discrete signal on line 38 to permit the $\Delta N_R$REF signal to be fed to summing junction 130. The $\Delta N_R$REF signal is of a magnitude and sense so as to add to the $N_R$REF signal, thereby raising the desired generator speed to a value above the rated 1800 rpm, depending on the magnitude of the $\Delta N_R$REF signal. Since, however, the $\Delta N_R$REF signal is utilized only when the synchronous generator is on line, and when blade angle control has been transferred to the torque control schedule 92 of FIG. 3, the $\Delta N_R REF$ signal acts as an overspeed protection.

A signal appears on line 42 when the synchronous generator 26 of FIG. 2 is at the desired frequency but not in phase with the load, this signal being of a magnitude and direction to temporarily increase or decrease the rotor reference speed $N_R REF$ on line 70. The presence of the signal on line 42, which is summed with the $N_R REF$ signal in summing junction 131, will slightly adjust the rotor speed until phase synchronization is achieved, at which time the signal on line 42 will become zero.

Assuming the switch 144 is open, and no signal appears on line 42, the signal on line 132, rotor speed error plus a constant times the rate of change of rotor speed, is then fed to proportional, integral and derivative controls which are combined to produce the $\beta_N$ signal on line 100. The proportional control comprises a gain multiplier 146, having a variable gain, $K_{NP}$, scheduled via a signal line 97b. The output from multiplier 146 is fed as one input to a summing junction 150. The integral control comprises a multiplier 152 having a variable gain, $K_{NI}$, scheduled via a line 97c, the output from multiplier 152 being fed via a line 156 as one input to a summing junction 158. The output from summing junction 158 is fed via a line 160 to an integrator circuit 162, the output from which is then fed via a line 164 to summing junction 150 where it is summed with the proportional control signal.

In accordance with another aspect of the invention, integrator tracking is used to keep the integrator 162 in an inactive control near the resultant reference blade angle $\beta_R$. The integrator output on the line 164 is fed to a summing junction 166 and compared with the $\beta_R$ feedback signal on line 128. The output from the summing junction 166, a blade angle error signal, is fed via line 168 to a gain circuit 170 having a deadband as shown in FIG. 6. The function of gain circuit 170 is to force the integral control signal to track the reference blade angle signal $\beta_R$ only when the blade angle scheduled by the integrator 162 in the rotor speed control differs substantially from the resultant reference blade angle $\beta_R$. The deadband insures that no tracking occurs when the scheduled blade angle on line 164 is close to that provided by the resultant reference blade angle $\beta_R$. The output from the gain circuit 170 is fed via a line 172 to the summing junction 158 to be summed with the integrator input on line 156, the signal on line 172 being zero when the blade angle error is within the deadband, and being non-zero to add to or substract from the integrator input when outside the deadband.

The derivative control comprises a multiplier circuit 174 having a variable gain, $K_{ND}$, scheduled via a signal line 97d, the output from the multiplier circuit 174 being fed via a signal line 178 to a derivative circuit 180. The derivative circuit output signal is fed via a line 182 to a summing junction 184 where it is combined with the integral and proportional control signals from summing junction 150 appearing on a line 186. The output from summing junction 184 is the rotor speed control blade angle reference signal, $\beta_N$, on line 100.

In some applications the derivative circuits 134 and 180 of FIG. 6 may not be required, and these circuits may be eliminated, or the respective gains $K_N$ on line 97a and $K_{ND}$ on line 97d may be reduced to zero. The need for lead compensation depends on the nature of the sensed variable of operation.

The torque control schedule 92 (FIG. 3) is used to minimize rotor shaft torque variations and rotor blade stresses, due to wind gusts and turbulence, when the synchronous generator is connected to an electrical power grid. The preferred schedule senses the torque, Q, on the shaft connecting the wind turbine with the synchronous generator as its primary control variable. The actual shaft torque signal, Q, appears on signal line 64, and the desired operating torque signal, Q REF, appears on signal line 68. The torque control schedule 92 is similar to the rotor speed control schedule 88 in that the actual torque, Q, is compared with the desired torque, Q REF, and the resulting difference or error signal is used to modulate the rotor blade angle through proportional plus integral plus derivative controls so as to provide a stable, rapidly responding control loop which minimizes the torque variations. The proper section of control gains, in combination with a rapidly acting pitch angle control mechanism, provides damping on the torsional resonance resulting from the wind turbine inertia and the shaft spring rate. The control gains are also selected to minimize the torque excursions resulting from wind gusts. Providing damping to the torsional wind turbine rotor resonance helps to reduce blade stress, gearbox loads and shaft torques, and permits the use of a faster responding torque control loop. The output from the torque control schedule 92 is the torque control blade angle reference signal, $\beta_Q$, appearing on line 108. Feedback of the blade angle reference, $\beta_R$, is provided via line 128, and gain scheduling is provided via line 97.

The torque control schedule 92 produces the torque control blade angle reference signal, $\beta_Q$, on line 108 only when the synchronous generator is "on line", i.e., only when the output frequency and phase of the synchronous generators are synchronized with the power grid network, within the limits determined by the synchronizer circuit 30, FIG. 2. At the same time as the output from the synchronous generator is connected on line, the rotor speed control schedule 88 is converted into a speed topping or overspeed control. Hence, when the generator is connected on line, the wind turbine will always be underspeed relative to the desired rotor speed, $N_R REF$ plus $\Delta N_r REF$, and the rotor speed control blade angle reference signal on line 100, $\beta_N$, will call for a lower blade angle to increase the rotor speed. The torque control schedule 92, will limit the blade angle to conform to the torque limitations of the system, and will under most circumstances call for a higher blade angle, i.e., a blade angle closer to feather. Since the most select circuit 98 of FIG. 3 passes the highest blade angle signal, the torque control blade angle reference signal, $\beta_Q$, will be the one passed therethrough, and the rotor speed control schedule 88 will be effective only in emergency situations when the rotor overspeeds, at which time the rotor speed control blade angle reference signal, $\beta_N$, will be the signal calling for the higher blade angle.

Figure 8:
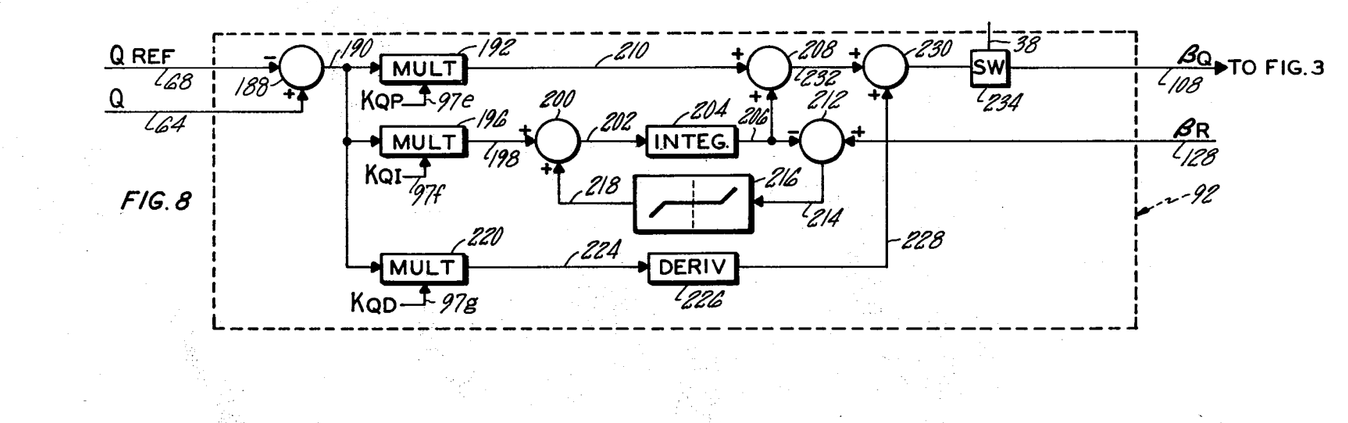
FIG. 8 is a schematic block diagram of the shaft torque control schedule.

FIG. 8 shows the details of the torque control schedule 92 of FIG. 3. The measured torque signal, Q, on line 64, and the desired torque signal, Q REF, on line 68 are compared at a summing junction 188 to produce a torque error signal on a signal line 190. Proportional control is provided by a multiplier 192 having a variable gain, $K_{QP}$, scheduled via a line 97e. Integral control is provided by a multiplier 196 having a variable gain $K_{QI}$, scheduled via a line 97f. The output from multiplier 196 is fed via a line 198 to a summing junction 200, with the output from summing junction 200 being fed via a line 202 to an integrator 204. The integrator output is then fed via a line 206 to a summing junction 208 where it is added to the output from multiplier 192 on a line 210. Integrator tracking is provided as in the rotor speed control schedule (FIG. 6) by reference blade angle, $\beta_R$, on line 128, which is compared with the integrator output signal at a summing junction 212, the difference signal being fed via a line 214 through a gain circuit 216, and then via a line 218 to summing junction 200. The gain circuit 216 has a deadband, as shown in FIG. 8, to track the integrator 204 only when its output differs substantially from the reference blade angle, $\beta_R$.

Derivative control is provided by a multiplier 200 having a variable gain, $K_{QD}$, scheduled via a line 97g. The output from multiplier 220 is fed via a signal line 224 to a derivative circuit 226, and the output from the derivative circuit 226 is fed via a line 228 to a summing junction 230 where it is combined with the proportional plus integral output from summing junction 208 on a signal line 232.

The output on line 108 from summing junction 230, the proportional plus integral plus derivative torque control blade angle reference signal, $\beta_Q$, passes through a switch 234. The switch 234 is closed, permitting the reference blade angle signal $\beta_Q$ to pass therethrough, only when the synchronous generator is connected on line, and a discrete signal is produced by synchronizer circuit 30 (FIG. 3) on line 38. The signal on lines 38 closes switch 40 (FIG. 2), connecting the synchronous generator to the power grid network, and at the same time closes switches 144 (FIG. 6) and 234 (FIG. 8), converting the rotor speed control schedule 88 into a speed topping control as previously described, and also connecting the torque control schedule 92 into the system. If the synchronous generator is disconnected from the power grid network for some reason, or if the frequency and/or phase of the synchronous generator deviates from that of the power grid network, the discrete signal on line 38 is removed, opening switches 40, 144 and 234, and the wind turbine reverts to rotor speed control.

While connected on line, and thus with the blade angle under the control of the torque control schedule 92, generator speed and thus output frequency are maintained reasonably constant by the power grid network. Once connected on line, the power grid network will tend to maintain the speed of the synchronous generator at the grid network frequency, and in phase therewith. A reduced rotor shaft stiffness will reduce the spring rate of the shaft connecting the wind turbine to the synchronous generator and help to reduce shaft torque disturbances.

Figure 7:
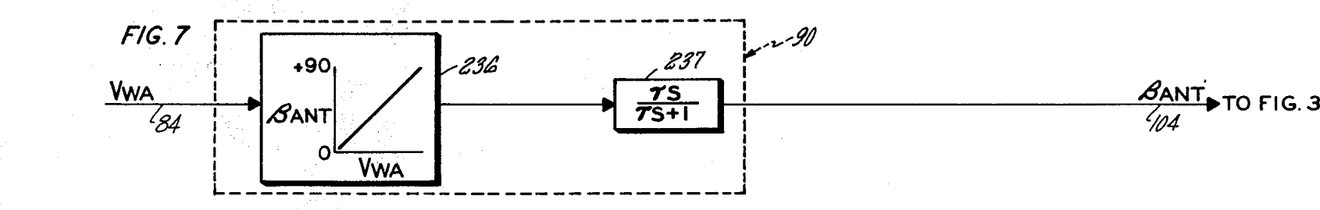
FIG. 7 is a schematic diagram of the wind anticipation control schedule.

In accordance with another aspect of the invention, further aid in reducing shaft torque excursions when on line, and in reducing speed excursions when off line, is the wind anticipation control schedule 90 of FIG. 3, shown in detail in FIG. 7. The wind anticipation control schedule 90 produces a signal on line 104, $\beta_{ANT}$, for rapidly changing wind conditions through a nominal schedule of wind turbine blade angle, block 236, as a function of wind velocity, $V_{WA}$, which appears as an input signal to block 236 on line 84, and a derivative overlay anticipatory circuit in block 237. The wind anticipation schedule in block 236 is obtained by calculating the blade angle required to provide a constant power output for different wind velocities, assuming that the generator speed is constant at the desired reference value. Two wind anticipation schedules may be used, one derived for 100% power when on line torque control is utilized, and the second derived for $\approx 0\%$ power when off line. In either case the $\beta_{ANT}$ signal on line 104 is nonzero only during rapidly changing wind conditions. The signal is added to the rotor speed control blade angle reference signal, $\beta_N$, at summing junction 102, and is also added to the torque control blade angle reference signal, $\beta_Q$, at summing junction 110. As wind velocity varies, the anticipatory signal, $\beta_{ANT}$, schedules a change in blade angle which minimizes transient excursions in rotor speed or torque which would result from wind gusts. However, severe wind gusts will generally vary the torque or speed sufficiently to cause the generator to be taken off line until the proper frequency and phase are re-established.

Alternately, shaft torque excursions may be reduced by conventional slip coupling between the wind turbine and the synchronous generator.

The use of proportional plus derivative plus integral control, which combines into an integrator with quadratic lead compensation, in both the generator speed control and torque control schedules 88 and 92, significantly improves the stability and response of the control loops. Quadratic lead compensation introduces an underdamped anti-resonance before the primary system resonant frequency which provides additional phase lead to permit higher system gains and crossover frequency, thereby providing faster responding and more accurate control. Filtering may be necessary if the speed and/or torque sensors are too noisy.

Figure 5:
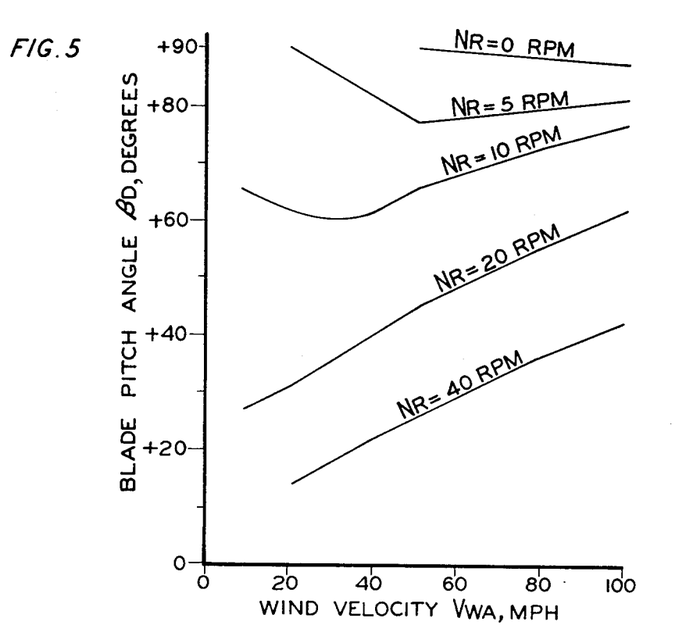
FIG. 5 is a graph showing the deceleration control schedule for the blade pitch angle.

The deceleration control schedule 94 of FIG. 3 is shown in graph form in FIG. 5. In the event the wind turbine must be shut down rapidly, it is important to limit the rate at which the blade angle is feathered to minimize the stresses developed in the blades when decelerating the wind turbine. In accordance with the invention, this limit is provided by incorporating a maximum blade angle limit which is scheduled as a function of average wind velocity, $V_{WA}$, and rotor rpm, $N_R$. The schedule is shown in FIG. 5 for a typical wind turbine, the deceleration control blade angle reference signal, $\beta_B$, being plotted versus wind velocity, $V_{WA}$, for selected rotor speeds, $N_R$. The schedule of FIG. 5 is implemented in FIG. 3 in which input signals of average wind velocity, $V_{WA}$, on line 84, and rotor rpm $N_R$, on line 56, are fed to the deceleration control schedule 94, the schedule being typically an analog or digital bivariate function generator which produces an output signal on line 120, $\beta_D$, which is in turn fed as an input to least select circuit 122. During normal operation of the wind turbine, the deceleration control schedule 94 will produce a blade angle reference signal, $\beta_D$, which calls for a blade angle larger than that scheduled by the rotor speed control schedule 88 or the torque control schedule 92. Hence the signal passed through the least select circuit 122 will be the one appearing on input line 118 which calls for the lowest blade angle. If the wind decreases below the velocity required to generate rated power or speed, the signal on line 118 will call for an even lower blade angle.

The deceleration control schedule will be in sole control of the blade pitch angle when it is desired to shut down the wind turbine, that is, when switch 76 in the feather signal line 74 is closed. By closing switch 76, a FEATHER signal appears on line 74 and is fed to summing junction 116, the FEATHER signal being of a magnitude to produce on line 118 a signal calling for a very large blade angle regardless of the signal on line 114, the other input to the summing junction 116. At this time the signal on line 120 will always call for a lower blade angle than the signal on line 118, and the least select circuit 122 will pass therethrough the deceleration blade angle reference signal, $\beta_D$, on line 120. The wind turbine will thus decelerate and stop in accordance with the schedule of FIG. 5, which limits the negative torque generated by the rotor to a value of about two times normal rated positive torque.

As with the acceleration control schedule 86, it is apparent that generator rpm, $N_G$, can be used in place of rotor rpm, $N_R$, in the deceleration schedule.

Feather switch 76 is shown as a manual switch which in fact operates as an on-off switch, since opening the switch will eliminate the FEATHER signal and cause acceleration of the wind turbine. It is apparent that feather switch 76 may be closed automatically if fail-safe circuitry is incorporated in the wind turbine, such as overspeed, overpower, or overtemperature sensors, and if such circuitry is connected to switch 76 to cause closure thereof if an unsafe condition of operation is sensed. Other mechanical features such as a shaft brake may be incorporated as is well known to those skilled in the art.

Figure 9:
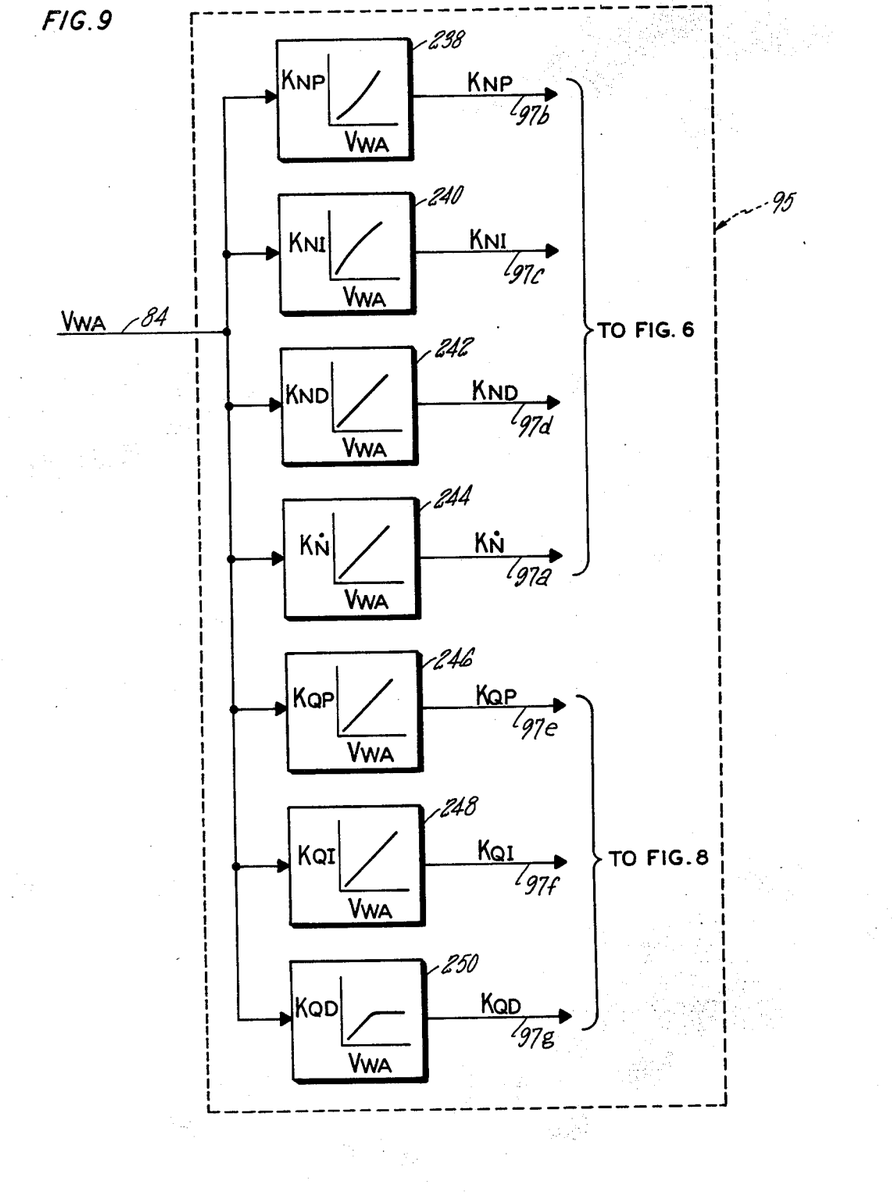
FIG. 9 is a schematic block diagram of the gain schedules for the control loops of FIGS. 6 and 8.

Because of the nonlinear aerodynamic performance of the wind turbine, it is desirable to vary the control gains in the closed loop controls in response to operating conditions to optimize stability and transient response. The preferred implementation is shown in FIG. 9 in which the average wind velocity, $V_{WA}$, on line 84 (FIG. 1), is fed into the gain schedule 95 (FIG. 3) which contains a plurality of analog or digital function generators, 238, 240, 242, 244, 246, 248 and 250, which in turn produce output signals on lines 97b, 97c, 97d, 97a, 97e, 97f and 97g respectively, indicative of the scheduled control gains $K_{NP}$, $K_{NI}$, $K_{ND}$, $K_N$, $K_{QP}$, $K_{QI}$, and $K_{QD}$ respectively. The control gains are fed to the appropriate gain multipliers in FIGS. 6 and 8 to schedule the gain of the multipliers as a function of wind velocity. The gain curves shown in the function generators of FIG. 9 are merely illustrative, since the actual gains will depend on many factors and cannot be determined accurately without analysis of the specific design and components of the wind turbine.

Figure 10:
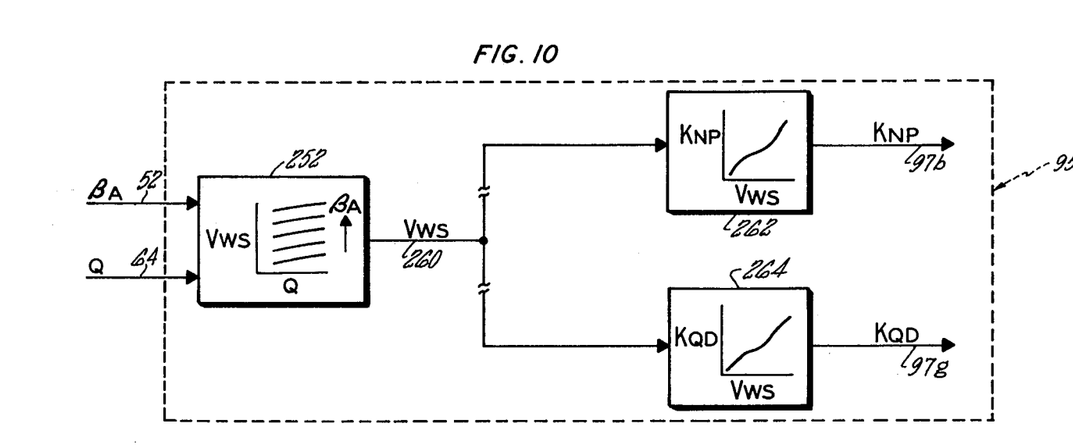
FIG. 10 is a schematic diagram of a variation of the gain scheduling shown in FIG. 9 using synthesized wind velocity.

As an alternative to scheduling the control gains as a function of average wind velocity as in FIG. 9, the control gains may be scheduled as a function of a synthesized wind speed, which is a function of turbine blade pitch angle and shaft torque. In accordance with this aspect of the invention, a preferred implementation is shown in FIG. 10 in which signals indicative of the actual blade angle, $\beta_A$, and shaft torque, Q, on lines 52 and 64 (FIG. 1) are fed into the gain schedule 95 to an analog or digital bivariate function generator 252 in which shaft torque, Q, is varied as a function of synthesized wind speed, $V_{WS}$, for a plurality of rotor blade angles, $\beta_A$. The output from the function generator 252, synthesized wind speed, $V_{WS}$, appears on line 260 and is fed to function generators 262, 264, which schedule control gains $K_{NP}$, $K_{QD}$, on lines 97b and 97g respectively. The other five gain function generators illustrated in FIG. 9 have been omitted from FIG. 10 for simplicity. Again, the curves shown in the function generators of FIG. 10 are merely illustrative, but are similar to those described in FIG. 9.

It is apparent that other combinations of wind velocity, blade pitch angle and shaft torque, as well as other parameters, can be utilized for scheduling the variable control gains. Most prior art control systems use constant gains in the control loops, but with the advent of low cost digital microcomputers, it is simple and inexpensive to incorporate variable gains in the control system.

Figure 11:
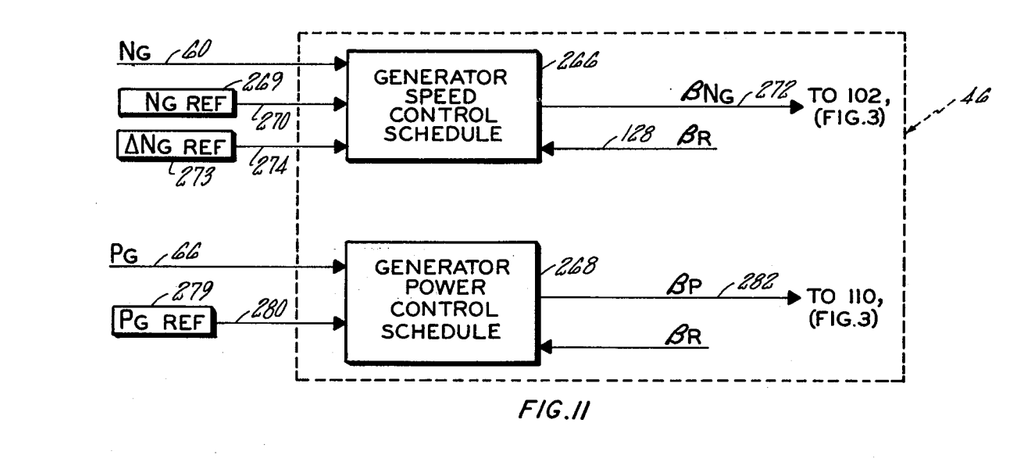
FIG. 11 is a schematic block diagram of alternative closed loop controls for blade pitch angle.

FIG. 11 shows a modification of the blade pitch angle control 46 of FIG. 3, in which the rotor speed control schedule 88 has been replaced by a generator speed control schedule 266, and the torque control schedule 92 has been replaced by a generator power control schedule 268. In the generator speed control schedule, actual generator speed, $N_G$, on signal line 60, is compared with a desired generator speed, $N_GREF$, generated in a block 269 and appearing on a signal line 270, to produce an error signal, and proportional plus integral plus derivative controls with variable gains are included in the control schedule 266, in a manner similar to that described in conjunction with FIG. 6, to produce a generator speed blade angle reference signal, $\beta_{NG}$, on a signal line 272. Speed topping is provided by adding to the $N_GREF$ signal a $\Delta N_GREF$ signal generated in a block 273 and appearing on a line 274 when the synchronous generator is connected on line. Integrator tracking is also provided as in FIG. 6 using the reference blade angle, $\beta_R$, on line 128. The variable gain inputs to block 266 are not shown.

The generator power control schedule shown in a block 268 of FIG. 11 is similar in operation to the torque control schedule 92 of FIG. 8. The output electrical power, $P_G$, from the synchronous generator on line 66, FIG. 1, (or alternatively the current output only), is compared with a desired generator power reference signal, $P_GREF$, generated in a block 279 and appearing on a line 280, (or alternatively a desired generator current reference signal), to produce an error signal, and proportional plus integral plus derivative controls, variable gains, and integrator tracking, are provided similar to the control of FIG. 8, to produce a generator power (or current) blade angle reference signal, $\beta_P$, on a line 282. The addition of wind anticipation control blade angle reference signal, $\beta_{ANT}$, to the reference signals $\beta_{NG}$ and $\beta_P$, and the use of switching to connect the generator power control schedule into the system only when the generator is on line, may be implemented in the manner previously described.

In applications where more electrical power is required than can be supplied by a single wind turbine, a plurality of wind turbines may be placed in parallel, but the respective synchronous generators must produce the same electrical frequency and phase. Paralleling is not accomplished by varying the magnitude of the generated voltages as in d.c. voltage generation, but by varying the power input to the wind turbines by scheduling the rotor blade angle.

The operation of the control system has been described primarily with reference to block diagrams and function generators, without specific descriptions of the construction thereof. It is apparent that the control system may be constructed entirely in analog format, with the signals on the various lines being voltage levels. It is also apparent, however, that the preferred implementation of the control system is digital, using existing microprocessors and/or digital computers to perform the necessary control functions. In its digital form, conversion of the sensed parameter signals from analog to digital, and reconversion of the actuator control signals from digital to analog, may be required.

While the wind turbine control system has been described in its preferred embodiment, and the best mode of implementation has been disclosed, it is apparent that changes and modifications may be made to the construction and arrangement of the system and components thereof without departing from the invention as hereinafter claimed.

I claim:

1. In a power generating system including a wind turbine driven source of energy, said wind turbine having a wind driven rotor with a plurality of variable pitch blades, a control for minimizing mechanical stresses in said system during rapid angular momentum changes of said rotor such as during startup and shutdown comprising:
   means for sensing a rotational speed of said system and producing a first signal indicative thereof,
   means for sensing the velocity of the wind driving said rotor and producing a second signal indicative thereof,
   scheduling means receiving said first and second signals and producing as a function thereof a desired blade pitch angle signal,
   and blade pitch angle control means receiving said desired blade pitch angle signal and responsive thereto for regulating the pitch angle of said rotor blades.

2. A power generating system as in claim 1 in which said rotor is accelerating, and in which said scheduling means includes means for producing a minimum desired blade pitch angle signal relative to the blade pitch angle at which said blade is fully powered.

3. A power generating system as in claim 1 in which said rotor is decelerating, and in which said scheduling means includes means for producing a maximum desired blade pitch angle signal relative to the blade pitch angle at which said blade is fully powered.

4. A power generating system as in claim 1 in which said blade pitch angle control means includes:
   means for measuring the actual pitch angle of said rotor blades and producing a third signal indicative thereof,
   comparator means comparing said desired blade pitch angle signal with said actual blade pitch angle signal and producing a blade pitch angle error signal,
   and actuator means responsive to said blade pitch angle error signal for regulating said blade pitch angle.

5. A power generating system as in claim 1 in which said means for sensing a rotational speed of said system includes means for measuring the rotational speed of said rotor.

6. A power generating system as in claim 1 in which said source of energy is an electrical generator driven by said rotor, and in which said means for sensing a rotational speed of said system includes means for measuring the speed of said generator.

* * * * *

UNITED STATES PATENT AND TRADEMARK OFFICE
CERTIFICATE OF CORRECTION

PATENT NO. : 4,189,648
DATED : February 19, 1980
INVENTOR(S) : Kermit I. Harner

It is certified that error appears in the above-identified patent and that said Letters Patent are hereby corrected as shown below:

Column 4, line 45: "10" should be -- 20 --

Column 13, line 16: "200" should be -- 220 --

Signed and Sealed this

Twenty-seventh Day of May 1980

[SEAL]

Attest:

SIDNEY A. DIAMOND

Attesting Officer     Commissioner of Patents and Trademarks